Figure 1:
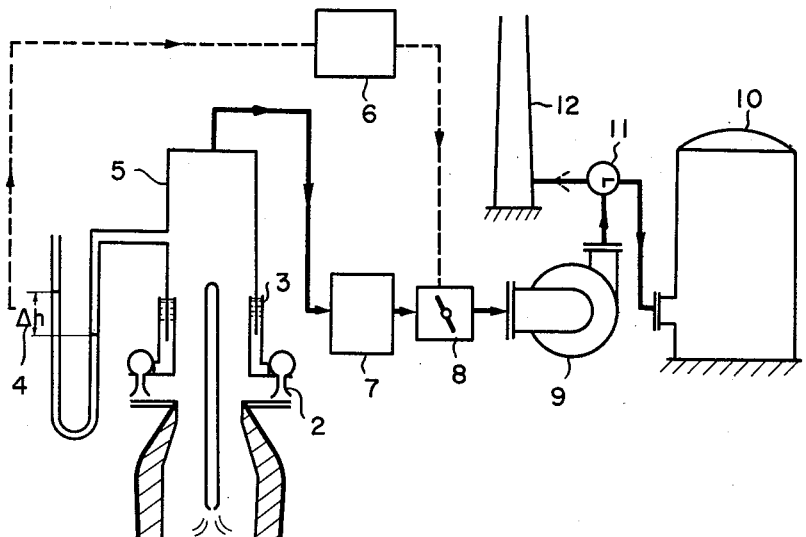

Aug. 4, 1964

KEIJI OKANIWA ETAL 3,143,142
APPARATUS FOR SELECTIVE RECOVERY OF WASTE GAS FROM
OXYGEN TOP BLOWING CONVERTER
Filed April 5, 1962

INVENTOR.
Keiji Okaniwa
Isao Takatama
Shigeru Maehara
Isoji Igarashi

3,143,142
APPARATUS FOR SELECTIVE RECOVERY OF WASTE GAS FROM OXYGEN TOP BLOWING CONVERTER

Keiji Okaniwa and Isao Takatama, Tsurumi-ku, Yokohama, and Shigeru Maehara and Isoji Igarashi, Yawata, Japan, assignors to Yawata Iron & Steel Co., Ltd., and Yokoyama Engineering Co., Ltd., Tokyo, Japan, both corporations of Japan
Filed Apr. 5, 1962, Ser. No. 185,392
Claims priority, application Japan Apr. 10, 1961
2 Claims. (Cl. 137—628)

The present invention relates to an apparatus for selective recovery of the waste gas in unburned state from an oxygen top blowing converter.

Since the waste gas discharged from an oxygen top blowing converter contains 80–90% CO gas highly useful as material for synthetic-chemical industry, various attempts have been made to improve the method for recovering the waste gas in unburned state. The method for recovering the waste gas in unburned state from the converter under this invention is summarized as follows:

The waste gas discharged from the converter is received into a cooler, the joint of which with the converter is sealed from the open atmosphere, and such waste gas at temperature about 1,450° C. immediately after discharge is cooled down to about 400° C. Then, this cooled gas is led to a dust collector in which more than 99% of dust is excluded and then to an induced draft fan. In this way, the waste gas throughout the entire blowing period can be freed from dust and purified. However, the waste gas discharged from the converter at the initial and final stages of the blowing is poor in CO contents and lacks use value. So it will be released into the air. Only the waste gas rich in CO contents discharged at the peak stage of the blowing is recovered in a gas holder. For such purpose, it is necessary to use an induced draft fan with forcing draft action by which the waste gas will be delivered and forced into the gas holder. But, the results of the experiments clearly show that because of the gas pressure being usually kept at the positive pressure of several hundred millimeters water column on the recovering side while at the atmospheric pressure on the releasing side the delivery pressure of the induced draft fan rapidly falls with the flow growing so rapidly in volume that the proper functioning of the gas flow regulating valve will be crippled and thereby the control of the inside pressure in the cooling device will be disturbed. To eliminate the foregoing drawback, the present invention succeeded in effecting the safe and positive recovery and release of the waste gas by providing at the exit of an induced draft fan a switch valve.

This invention is characterized in providing, in recovering the waste gas in unburned state by an induced draft fan through gas pipe, a regulating valve in the gas holder circuit and a plurality of regulating valves different in working speed in the release tower circuit.

A preferred embodiment of this invention will be explained in detail with reference to the attached drawings.

Figure 2:
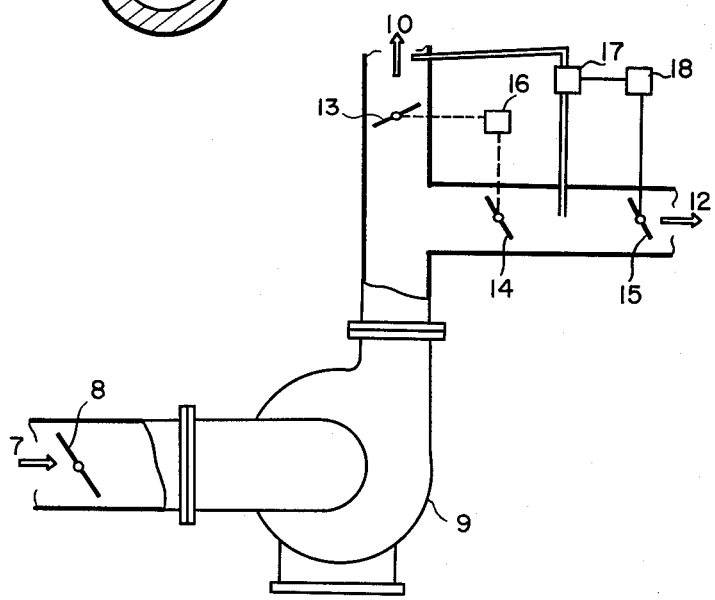

FIG. 1 is a flow chart showing recovering of the waste gas in unburned state by means of the apparatus of this invention, and FIG. 2 is a partial section magnifying the three-way switch valve device of this invention.

In FIG. 1, converter is shown by 1, an inert gas curtain by 2, a vertically movable skirt by 3, the differential pressure in the furnace of the cooling device (water column) by 4, cooling device by 5, an automatic control device by 6, a dust collector by 7, a gas flow regulating valve by 8, an induced draft fan by 9, a gas holder by 10, a three-way switch valve by 11, and a gas release tower by 12.

A vertically movable skirt 3 is provided to isolate the waste gas discharged from the converter 1 from the open atmosphere and to receive the same into the cooling device, and the skirt and the converter throat are enclosed by an inert gas (nitrogen for example) curtain to isolate the waste gas from the open atmosphere.

The inside pressure in the furnace of the cooling device 4, which is expressed in terms of $\Delta h$, is controlled to be kept at the positive pressure under several mm. water column by means of flow regulating valve 8 and automatic control system.

The purified waste gas sent forth from an induced draft fan 9 is, at the initial and final stages of the blowing when CO contents of the gas is low and poor in use value, released into the open air from the release tower 12 by means of the three-way switch valve 11. The CO rich useful gas discharged at the peak stage of the blowing is led and stored in the gas holder 10 by switching over the three-way switch valve 11. That is to say, the waste gas discharged from the converter is received into the cooling device, the joint of which with the converter throat is isolated by both mechanical and air sealings and then the gas is cooled from temperature of 1,450° C. immediately after discharged to about 400° C. This cooled gas is then led into the dust collector wherein more than 99% of the dust is excluded and then the purified gas reaches the induced draft fan with forcing draft action.

FIG. 2 is a detailed section showing the three-way switch device under the present invention. In FIG. 2, the valve to regulate the pressure in the cooling device and converter is indicated by 8, an induced draft fan by 9, a butterfly valve on the side of the gas holder by 13, butterfly valves on the side of the gas release tower by 14 and 15, a reverse action linking mechanism by 16, and an automatic controller by 18.

In the foregoing waste gas recovery equipment, the key to the successful waste gas recovery lies in the proper control of the inside pressure in the furnace of the cooling device $\Delta h$ by means of the gas flow control valve 8. If this gas flow regulating valve fails, for some reason or other, to work in quick response to the change in the inside pressure in the furnace of the cooling device $\Delta h$, the proper control of the inside pressure in the cooling device will be lost and the waste gas will tend to leak from the openings of the converter and the skirt or open air will tend to infiltrate into the cooling device. Leakage of the waste gas must be checked because CO contained in the waste gas is toxic and also abnormal infiltration of the open air should be avoided because it will become the cause of inviting an explosion of CO gas. When the waste gas is switched on to the releasing side from the recovery side, the delivery pressure of the induced draft fan 9 will rapidly fall and the volume of blast from the fan will rapidly increase, being grounded upon the specific curve of the blast volume of the fan and of the delivery pressure. The gas flow regulating valve 8 located at the entrance to the fan to control the inside pressure in the cooling device is liable to fail to work in quick response to the too drastic change in flow volume causing confusion in control of the inside pressure in the furnace of the cooling device.

During recovering operation, the butterfly valve 13 opens and the said valves 14 and 15 close and the waste gas drawn by an induced draft fan 9 is led into the gas holder, and during releasing operation the valve 13 closes and the valves 14 and 15 open and the waste gas escapes to the releasing tower. As stated previously the waste gas containing CO as much as 80–90% involves explosion hazard and is liable, depending upon working of these butterfly valves, to become an ignition source for explosion.

In a single alternative action only for the purpose of opening the butterfly valve 13 and closing the valves 14 and 15, or vice versa, at the time of switching over the valves the gross flow volume of the gas, that is the sum of the volume of the gas to be supplied into the gas holder and the volume of the gas to be led to the releasing tower, undergoes a drastic change, the proper control of the flow of the waste gas by the butterfly valve 8 is not carried out satisfactorily and further as a result of a drastic change in the flow volume of the gas the impact waves is generated from the butterfly valves in the gas flow. Since these impact waves are liable to become the ignition source for provoking of explosion, these waves must be absolutely eliminated. To meet with the requirements for proper working of the valves at the time of switching, the gross flow volume of the gas for both valves must be kept always constant so as to prevent such impact waves from occurring and at the same time quick and effective working of the valves must be secured. Firstly, in the equipment under the present invention, the butterfly valves 13 and 14 are specially designed to give valve action which is very slow initially and gradually accelerated in order to prevent drastic change in gas flow usually seen at the time of opening and closing of the valves of conventional type. Secondly, in the equipment under this invention, a secondary butterfly valve 15 for pressure regulating is equipped to minimize the pressure difference between before and behind the valves owing to switching of the valves and to maintain the gross flow of gas at a constant level by preventing drastic change in delivery pressure of the fan. Because, as described previously, the waste gas is forced into the gas holder at the pressure as high as several hundred millimeters water column and released to the releasing tower at the atmospheric pressure and so if switching-over is carried out by only two butterfly valves 13 and 14 a drastic change in gas pressure will take place, such as from the pressurized state to the atmospheric pressure or vice versa. In other words, a sudden change in the delivery pressure will cause a drastic change in the gas blow volume, will disturb a control of the inside pressure in the cooling device, and will cause impact waves, inviting an unexpected calamity.

That is to say, at the time of the recovering operation, the valve 13 is opened and the valves 14 and 15 are closed and the pressure of the gas delivered from the induced draft fan 9 is same as the storage pressure of several hundred millimeters water column. And when switched from recovery to release operation, the valve 13 starts to close and at the same time the valve 14 also starts to open, but the valve 15 works to equalize the pressure between the valves 14 and 15 to the pressure on the gas holder side.

To explain this in more detail, the valves 13 and 14 are connected with the reverse action linking mechanism 16 and the deflection in pressure between the pressure on the holder side and the pressure between valves 14 and 15 is measured by the gauge 17 and the valve 15 is automatically regulated by the control 18 to reduce the said deflection in pressure to zero. The valves 13 and 14 are only for switching the gas flow and the valve 15 is to prevent drastic change in gas pressure.

Next, during the period when the waste gas is released, the valve 13 is closed and the valve 14 is opened, but the delivery pressure from the fan, that is the pressure between the valves 14 and 15, becomes equal to the pressure on the holder side by the action of the valve 15.

When switched from release to recovery operation, the valve 14 starts to close and at the same time the valve 13 starts to open and the valve 15 works to prevent the drastic change in gas pressure so that the pressure in the system is at all time maintained in the following relation, as delivery pressure=gas pressure in the holder=gas pressure between the valves 14 and 15.

Therefore, by adopting the apparatus by this invention, recovery, storage and release of the waste gas in the unburned state can be made with safety and good result to the great industrial benefit.

What we claim is:

1. A gas flow switching apparatus for a waste gas recovery system for recovering waste gas from an oxygen top blowing converter having a cooling device fitted over the mouth of the converter, a dust collector connected to the cooling device for collecting and purifying the waste gas from the cooling device in the unburned state, an induced draft fan connected to said dust collector for drawing the unburned gas through the cooling device and dust collector, a flow regulating valve between said fan and said dust collector for regulating the pressure in said cooling device, a gas holder for holding the waste gas collected, and a stack for discharging waste gas to the atmosphere: said gas flow switching apparatus comprising a gas flow conduit adapted to be connected at one end to said induced draft fan, a collecting conduit branching from the other end of said gas flow conduit and adapted to be connected to said gas holder, a stack conduit branching from the other end of said gas flow conduit and adapted to be connected to the stack, a first switchover valve in said collecting conduit and a second switchover valve in said stack conduit, switchover valve operating means connected to said switchover valves for quickly closing one while quickly opening the other and vice versa, a pressure regulating valve in said stack conduit spaced from said second switchover valve in the direction toward the stack, valve actuating means connected to said pressure regulating valve, and pressure sensing and comparing means connected to said collecting conduit between said first switchover valve and the gas holder and to said stack conduit between said second switchover valve and said pressure regulating valve and coupled to said valve actuating means for causing said valve actuating means to close said pressure regulating valve when said first switchover valve is closed to regulate the pressure between said second switchover valve and said pressure regulating valve in response to the difference between the last mentioned pressure and the pressure in said gas holder.

2. An apparatus as claimed in claim 1 in which said pressure sensing and comparing means closes said pressure regulating valve until the difference between the pressure between the second switchover valve and the pressure regulating valve and the pressure in said gas holder is zero.

References Cited in the file of this patent

UNITED STATES PATENTS

| | | |
|---|---|---|
| 985,703 | Podlesak | Feb. 28, 1911 |
| 1,538,292 | Lindsay | May 19, 1925 |